United States Patent
Corden et al.

(10) Patent No.: US 10,165,090 B2
(45) Date of Patent: Dec. 25, 2018

(54) TRANSFERRING ROUTING PROTOCOL INFORMATION BETWEEN A SOFTWARE DEFINED NETWORK AND ONE OR MORE EXTERNAL NETWORKS

(71) Applicant: Metaswitch Networks Ltd, Enfield (GB)

(72) Inventors: Fiona Corden, Enfield (GB); Steve Balls, Enfield (GB); Alex Pollitt, San Francisco, CA (US); Shaun Crampton, San Francisco, CA (US); Jonathan Harrison, Enfield (GB); Jeff Rollins, San Francisco, CA (US)

(73) Assignee: Metaswitch Networks Ltd., Enfield (GB)

( * ) Notice: Subject to any disclaimer, the term of this patent is extended or adjusted under 35 U.S.C. 154(b) by 0 days.

(21) Appl. No.: 14/473,680

(22) Filed: Aug. 29, 2014

(65) Prior Publication Data

US 2016/0065696 A1     Mar. 3, 2016

(51) Int. Cl.
*H04L 29/06*     (2006.01)
*H04L 12/715*     (2013.01)
(Continued)

(52) U.S. Cl.
CPC ............ *H04L 69/08* (2013.01); *H04L 45/586* (2013.01); *H04L 45/64* (2013.01); *H04L 67/2814* (2013.01); *H04L 67/327* (2013.01)

(58) Field of Classification Search
CPC .............................. H04L 45/02; H04L 45/302
See application file for complete search history.

(56) References Cited

U.S. PATENT DOCUMENTS 8,693,374 B1 *   4/2014   Murphy .................. H04L 12/28
                                                          370/255
2011/0188373 A1    4/2011   Saito
(Continued)

FOREIGN PATENT DOCUMENTS

WO      2016029945 A1     3/2016

OTHER PUBLICATIONS

Website http://www.vanbever.eu/ displaying the news section of postdoctoral researcher at Princeton University, Laurent Vanbever; presentation on Nov. 14, 2013 "On integrating Software-Defined Networking within existing routing systems".

*Primary Examiner* — Sulaiman Nooristany
(74) *Attorney, Agent, or Firm* — EIP US LLP

(57) ABSTRACT

Measures for transferring routing protocol information between a software defined network and one or more external networks are provided. A control node in a software defined network (SDN) is configured to maintain a protocol information database comprising routing protocol information for one or more switching nodes in the SDN. In response to detecting occurrence of a predetermined trigger event, the control node modifies the routing protocol information in the protocol information database, and determines whether the one or more switching nodes include an edge switching node. In response to the determination, a routing protocol message is transmitted from the control node to the edge switching node for forwarding via an external network interface. The routing protocol message includes data generated on the basis of the modified routing protocol information.

28 Claims, 7 Drawing Sheets

(51) Int. Cl.
*H04L 12/713* (2013.01)
*H04L 29/08* (2006.01)

(56) References Cited

U.S. PATENT DOCUMENTS

| | | | | |
|---|---|---|---|---|
| 2013/0266007 | A1* | 10/2013 | Kumbhare | H04L 45/56 370/389 |
| 2013/0266018 | A1* | 10/2013 | Ashida | H04L 49/3009 370/392 |
| 2013/0318243 | A1 | 11/2013 | Chinthalapati | |
| 2014/0146664 | A1 | 5/2014 | Amante | |
| 2014/0376371 | A1* | 12/2014 | Flinck | H04L 45/04 370/230 |
| 2015/0063112 | A1* | 3/2015 | Wu | H04L 45/302 370/235 |
| 2015/0098475 | A1* | 4/2015 | Jayanarayana | H04L 45/38 370/400 |
| 2015/0381428 | A1* | 12/2015 | Ong | H04L 41/12 709/223 |

* cited by examiner

TRANSFERRING ROUTING PROTOCOL INFORMATION BETWEEN A SOFTWARE DEFINED NETWORK AND ONE OR MORE EXTERNAL NETWORKS

BACKGROUND OF THE INVENTION

Field of the Invention

The present disclosure relates to measures for transferring routing information in computer networks. In particular, but not exclusively, the present disclosure relates to transferring routing protocol information between a software defined network and one or more external networks.

Description of the Related Technology

Computer networks route information in the form of data packets between various network endpoints, such as servers and personal computers. A conventional computer network includes a large number of switching nodes, or 'switches', which are responsible for forwarding data packets in the computer network. A computer network may also include one or more routing nodes, or 'routers', which are responsible for interconnecting different computer networks. Some routing nodes in computer networks also include the functionality of a switching node.

A conventional switching node can be conceptually separated into two parts. A 'data plane' part is responsible for the forwarding of received data packets, i.e. the receipt of a data packet via a first one of the switch's network interfaces, and the transmission or 'forwarding' of that data packet via a second different one (or more) of the switch's network interfaces. In contrast, a 'control plane' part is responsible for determining which of the switch's network interfaces a received data packet should be transmitted through.

Information about the connectivity of various switches in a computer network, as well as the cost for reaching various endpoints via particular switches, is commonly communicated between the switches in the computer network using a routing protocol, such as an interior gateway protocol (IGP). Through use of such a routing protocol, the control plane of each of the switching nodes in the computer network may determine information about the network topology. This topology information is used by the control plane to calculate one or more preferred routes to other endpoints or border routers in the network. These determined preferred routes are used by the control plane to populate entries in a forwarding table which is accessed by the data plane of the switch when forwarding received data packets. Such forwarding table entries or 'forwarding rules' typically specify which network interface the switch should use for forwarding a data packet to a particular destination.

Recently, computer networks have begun to utilize a technique known as software defined networking, where a control plane entity (or 'control node') is deployed, which controls the data plane operation of several switching nodes in the network. In some software defined networking arrangements, more than one control node may be provided, with each control node being responsible for controlling the data plane operation of a subset, or 'cluster' of the switching nodes in the software defined network. A control node typically achieves this control by remotely configuring forwarding rules for each of the switches under its control. This arrangement removes the requirement for IGP information to be communicated between the switching nodes in the software defined network, as the control node can configure all of the data planes directly. Software defined networking also enables switching nodes of lower cost and complexity to be used in the network, as dedicated control plane hardware is not required for each of the switching nodes. Further, additional functionality such as more intelligent packet routing can also be provided by a control node in a software defined network, as the control node can configure packet forwarding routes across the whole cluster of switching nodes in a coordinated manner, rather than relying on the autonomous decision making of individual switching nodes.

In some scenarios, it may be desirable to deploy a cluster of software defined networking switches alongside conventional computer network equipment, i.e. switches with dedicated control and data plane parts. This may be the case where a full replacement of an existing network is not feasible, due to cost or network availability requirements for example. In such scenarios, in order to allow the conventional network equipment to learn information about the topology of the software defined networking cluster, and therefore include it in routing calculations and decisions, the software defined networking cluster is required to communicate with these neighboring networks using a recognized routing protocol, such as an IGP. However, the generation of such routing protocol information is not a requirement in software defined networks.

SUMMARY

According to a first aspect of the present invention, there is provided a method for transferring routing protocol information between a software defined network and one or more external networks, the method comprising: maintaining, at a control node responsible for controlling packet forwarding configurations of a plurality of switching nodes in the software defined network, a protocol information database comprising routing protocol information for one or more switching nodes in the plurality; in response to detecting occurrence of a predetermined trigger event, modifying, at the control node, the routing protocol information comprised within the protocol information database to create modified routing protocol information; determining, at the control node, that the one or more switching nodes include an edge switching node, the edge switching node comprising an external network interface which connects the edge switching node to an external network, different to the software defined network; and in response to the determination, transmitting a routing protocol message from the control node to the edge switching node for forwarding via the external network interface of the edge switching node, the routing protocol message comprising data generated at least on the basis of the modified routing protocol information.

According to a second aspect of the present invention, there is provided apparatus for use in transferring routing protocol information between a software defined network and one or more external networks, the apparatus comprising at least one processor, and at least one memory including computer program code, the at least one memory and the computer program code being configured to, with the at least one processor, cause the apparatus at least to: maintain, at a control node responsible for controlling packet forwarding configurations of a plurality of switching nodes in the software defined network, a protocol information database comprising routing protocol information for one or more switching nodes in the plurality; in response to detecting occurrence of a predetermined trigger event, modify, at the control node, the routing protocol information comprised within the protocol information database to create modified routing protocol information; determine, at the control node, that the one or more switching nodes include an edge switching node, the edge switching node comprising an external network interface which connects the edge switching node to an external network, different to the software defined network; and in response to the determination, transmit a routing protocol message from the control node to the edge switching node for forwarding via the external network interface of the edge switching node, the routing protocol message comprising data generated at least on the basis of the modified routing protocol information.

According to a third aspect of the present invention, there is provided computer program product comprising a non-transitory computer-readable storage medium having computer readable instructions stored thereon, the computer readable instructions being executable by a computerized device to cause the computerized device to perform the method of the first aspect of the invention.

Embodiments comprise a computer program product (for example computer software) adapted to perform the method of the first aspect of the present invention.

Further features of the present disclosure will become apparent from the following description of preferred embodiments, given by way of example only, which is made with reference to the accompanying drawings.

DETAILED DESCRIPTION OF CERTAIN INVENTIVE EMBODIMENTS

Figure 1:
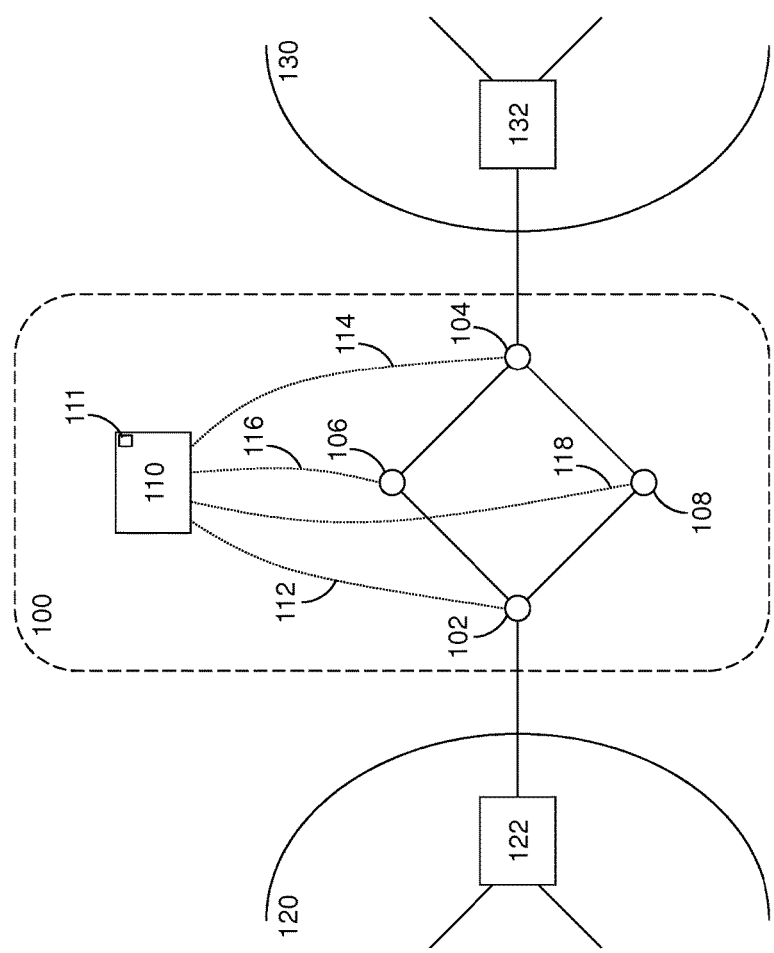
FIG. 1 shows an example software defined network (SDN) according to one or more embodiments of the present invention.

FIG. 1 shows an example software defined network (SDN) 100 according to embodiments. SDN 100 comprises a cluster of switching nodes, 102, 104, 106 and 108, as well as control node 110. Control node 110 is responsible for configuring switching nodes 102, 104, 106, 108 in the SDN. While FIG. 1 depicts four switching nodes 102, 104, 106, 108 in SDN 100, in alternative embodiments, the cluster may comprise more or fewer than the four depicted switching nodes. In some embodiments, SDN 100 may also comprise one or more switching nodes (not shown) which are not configured by control node 110. Such switching nodes may be autonomously configured, or may be configured by a different control node (not shown) to control node 110. In some arrangements, control node 110 may be considered a control plane entity, and the switching nodes 102, 104, 106 and 108 may be considered data plane entities.

In the embodiments depicted in FIG. 1, network links provide interconnection between switching nodes 102, 104, 106 and 108, for forwarding data packets between the various switching nodes. In the depicted embodiments, switching node 102 is connected to switching nodes 106 and 108; and switching node 104 is connected to switching nodes 106 and 108. FIG. 1 illustrates a relatively simple interconnection arrangement for the purposes of facilitating understanding of the present disclosure. In alternative embodiments, different arrangements of switching nodes and network links may be employed.

In embodiments, control node 110 is arranged to configure the packet forwarding configuration of switching nodes 102, 104, 106 and 108. In some embodiments, control node 110 configures switching nodes 102, 104, 106 and 108 by updating entries in forwarding tables located at the respective switching nodes. In order to update the entries in the forwarding tables at switching nodes 102, 104, 106, 108, control node 110 may transmit configuration messages via control links 112, 114, 116, 118 respectively. In some embodiments, control links 112, 114, 116 and 118 are dedicated physical links between the control node 110 and the respective switching node 102, 104, 106, 108. In alternative embodiments, control node 110 may be connected to switching nodes 102, 104, 106 and 108 via a single link, for example to one of the switching nodes 102, 104, 106, 108 through which configuration messages for all of the switching nodes 102, 104, 106, 108 are transmitted. In such embodiments, configuration messages may be transmitted to each other switching node in SDN 100 via the various network links between the switching nodes. Hence, in such embodiments control links in 112, 114, 116 and 118 may pass through one or more of the switching nodes in SDN 100. In some such embodiments, the control links are established via a packet tunneling protocol. In further embodiments, the control links may be established through operation of a broadcast local area network (LAN), which provides interconnection between control node 110 and switching nodes 102, 104, 106, 108

In the embodiments depicted in FIG. 1, SDN 100 is connected to neighboring networks 120 and 130 via switching nodes 102 and 104 respectively. In this manner, switching nodes 102 and 104 may be referred to as edge switching nodes. Edge switching nodes 102 and 104 interface between SDN 100 and entities in networks 120 and 130 respectively, which are different to SDN 100. Edge switching node 102 is connected to neighboring network entity 122 in neighboring network 120. Similarly, edge switching node 104 is connected to neighboring network entity 132 in neighboring network 130. In embodiments, neighboring network entities 122, 132 may be border gateway entities, routers or suchlike. Neighboring networks 120 and 130 may also be referred to as external networks to SDN 100. The network links interconnecting the switching nodes in SDN 100 may be referred to as internal links, whereas the network links connecting edge switching node 102, 104 to entities 122, 132 in external networks 120, 130 may be referred to as external links. Each switching node 102, 104, 106, 108 includes one or more internal network interfaces, i.e. network interfaces which are connected to internal links, and therefore connect the respective switching node to another switching node in SDN 100. Each edge switching node 102, 104 also includes one or more external network interfaces, i.e. network interfaces which are connected to external links, and therefore connect the respective edge switching node to an entity 122, 132 in an external network 120, 130.

In the depicted embodiments, SDN 100 is connected to neighboring networks 120 and 130. In alternative embodiments, SDN 100 may be connected to more or fewer than the two depicted neighboring networks. In some embodiments, more than one edge switching node in the SDN may be connected to entities in the same external network. In some embodiments, an edge switching node may be connected to more than one entity in an external network, or to entities in more than one external network. In some embodiments, SDN 100 may provide interconnection between at least external networks 120 and 130. In some such embodiments, SDN 100 may be a switching fabric, or may form a part of a switching fabric. In embodiments, neighboring networks 120, 130 are conventional, legacy networks which are not software-defined. In some embodiments, neighboring networks 120 and 130 may also be directly connected, or may be connected via one or more further computer networks, different to SDN 100. In some embodiments, neighboring networks 120 and 130 may comprise the same network.

In order to communicate network topology information to neighboring external networks 120, 130 and thereby enable SDN 100 to be included in routing decisions made by entities in external networks, SDN 100 is configured to provide routing protocol information to entities in neighboring external networks in the form of routing protocol messages. To generate the necessary routing protocol messages, in some embodiments, control node 110 in SDN 100 may conduct protocol message processing for each switching node 102, 104, 106, 108 in SDN 100.

Routing protocol message processing in a conventional, legacy network is typically performed by each legacy switching node, for example in response to receipt of a routing protocol message from a neighboring node in the network. A routing protocol message may include updated protocol information relating to the topology of the network. A received routing protocol message is passed from the data plane to the control plane within the legacy switching node for processing. The control plane processes the updated protocol information and adjusts the packet forwarding behavior of the legacy switching node if appropriate. Finally, the control plane generates a new routing protocol message, and passes it to the data plane within the legacy switching node for transmission to one or more neighboring nodes.

Control node 110 provides centralized control plane functionality for switching nodes 102, 104, 106 and 108. Therefore, routing protocol messages received by switching nodes 102, 104, 106 and 108 may be transmitted to control node 110 via control links 112, 114, 116, 118 respectively. Control node 110 may then process a received routing protocol message on behalf of the respective switching node, for example by updating the packet forwarding configuration of the respective switching node, and generating a new routing protocol message for transmission by the switching node. Control node 110 may then transmit the new routing protocol message to the respective switching node for transmission via its network interfaces.

In embodiments, control node 110 maintains protocol information databases associated with switching nodes 102, 104, 10, 108 in SDN 100. In some embodiments, control node 110 maintains one protocol information database for each switching node 102, 104, 106, 108 in SDN 100. Such protocol information databases comprise routing protocol information for the corresponding switching node 102, 104, 106, 108 in SDN 100. The protocol information databases may comprise information on the various network endpoints, border entities, routers etc. that may be reached by the corresponding switching node 102, 104, 106, 108, as well as the link cost associated with reaching that particular destination. In some embodiments, one or more of the protocol information databases are stored within control node 110, for example in volatile or non-volatile memory. In further embodiments, one or more of the protocol information databases are located externally to control node 110, but are accessible by control node 110. In embodiments, control node 110 is configured to modify a protocol information database in response to occurrence of a predetermined trigger event associated with the corresponding switching node 102, 104, 106, 108. Modification of routing protocol information by control node 110 may for example comprise updating the link costs associated with reaching certain destinations, adding new destinations that may be reached, or removing certain destinations that can no longer be reached. Predetermined trigger events may for example include detecting a change in the network topology, or receipt of a routing protocol message.

According to embodiments, control node 110 is configured to determine whether the switching node that corresponds to the routing protocol information database is an edge switching node, i.e. a switching node which has an external network interface. In response to determining that the switching node is an edge switching node, control node 110 is configured to transmit a routing protocol message to the edge switching node for forwarding via its external network interface. The determination of whether the switching node is an edge switching node enables the transmission of routing protocol messages which would only be forwarded via the internal interfaces of switching nodes 102, 104, 106, 108 to be avoided. Such routing protocol messages would otherwise be received by another switching node 102, 104, 106, 108 in SDN 100, and then transmitted back to control node 110 via the respective control link 112, 114, 116, 118. Identification of edge switching nodes 102, 104 by control node 110 therefore enables more efficient utilization of the capacity of the internal links in SDN 100.

In embodiments, control node 110 is configured to generate the routing protocol message using the modified routing protocol information. In some such embodiments, the generated routing protocol message comprises data generated at least on the basis of the modified routing protocol information.

Figure 2:
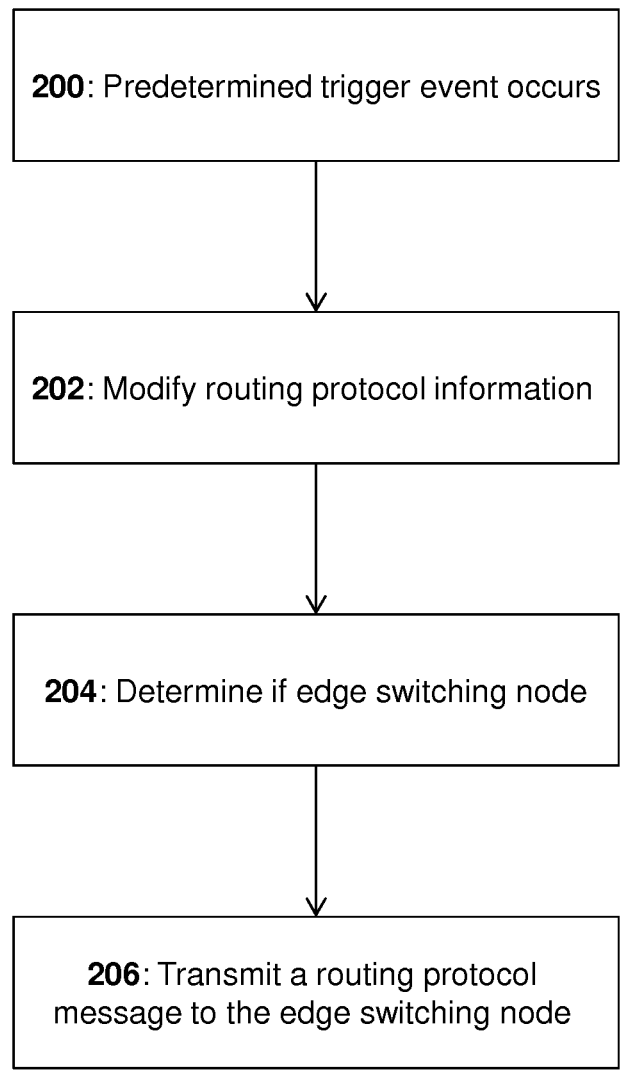
FIG. 2 shows a process flow diagram for a protocol information processing procedure according to one or more embodiments of the present invention.

FIG. 2 illustrates a process flow diagram for a protocol information processing procedure according to embodiments. At step 200, a predetermined trigger event occurs, for example in relation to a particular switching node in SDN 100. In response to occurrence of the predetermined trigger event, control node 110 modifies the routing protocol information in the protocol information database associated with that switching node at step 202. Having modified the routing protocol information, control node 110 determines that the switching node is an edge switching node at step 204. In response to this determination, control node 110 is configured to transmit a routing protocol message to the edge switching node for forwarding via its external network interface.

In some embodiments, control node 110 comprises one or more protocol processing functions. A protocol processing function is responsible for maintaining the routing protocol information stored in a given protocol information database. A protocol processing function may therefore be considered to be associated with the given protocol information database, and/or the corresponding switching node 102, 104, 106, 108. In embodiments, one or more of the aforementioned steps of: modification of the database; generation of the routing protocol message; and transmission of the routing protocol message may be performed by the protocol processing function associated with the respective protocol information database or switching node 102, 104, 106, 108. In some embodiments, the routing protocol comprises an Interior Gateway Protocol (IGP), such as Open Shortest Path First (OSPF) or Interior System to Interior System (IS-IS). In such embodiments, one or more of the protocol information databases may comprise IGP, OSPF or IS-IS databases. In some such embodiments, one or more of the protocol processing functions may comprise IGP, OSPF or IS-IS processing instances, or software 'stacks'. In some such embodiments, one or more of the routing protocol messages may comprise IGP, OSPF or IS-IS protocol messages.

In embodiments, routing protocol messages generated by control node 110 which are intended for transmission via an internal interface of a switching node 102, 104, 106, 108 in SDN 100 are transmitted between the associated protocol processing functions within control node 110. Hence, transmission of such routing protocol messages on control links 112, 114, 116 and 118, as well as on the internal network links of SDN 100, may be avoided. Such routing protocol messages may also be generated on the basis of the modified routing protocol information. In embodiments, transmission of routing protocol messages from control node 110 to switching nodes 102, 104, 106, 108 for transmission via internal network interfaces is inhibited. In embodiments, transmission of routing protocol messages from control node 110 to switching nodes 102, 104, 106, 108 that are not edge switching nodes 102, 104, is inhibited In some embodiments, an emulated network is emulated within control node 110, which provides connectivity between the various protocol processing functions. In some such embodiments, a protocol processing function may determine whether a particular generated routing protocol message is for transmission via an internal network interface or an external network interface of the corresponding switching node prior to transmission of the generated routing protocol message. If the generated routing protocol message is for transmission via an external network interface (i.e. if the switching node is an external switching node), then the generated routing protocol message may be transmitted to the external switching node via the corresponding control link 112, 114, 116, 118 for forwarding via that external network interface. Alternatively, if the generated routing protocol message is for transmission via an internal network interface (i.e. to a second switching node in SDN 100), the generated routing protocol message may be transmitted to the protocol processing function associated with that second switching node 102, 104, 106, 108 via the network emulated within control node 110.

In some embodiments, the predetermined trigger event may comprise receipt of an initial routing protocol message at control node 110. The initial routing protocol message may have been forwarded to control node 110 by a given switching node 102, 104, 106, 108 via the respective control link 112, 114, 116, 118. In response to receipt of the initial routing protocol message, control node 110 may modify the routing protocol information in the protocol information database associated with the given switching node 102, 104, 106, 108. The modified routing protocol information may then be used to generate a routing protocol message for transmission. In embodiments, in order to prevent unnecessary routing protocol messaging in the network, forwarding of a generated routing protocol message via the network interface through which initial routing protocol message was received at the given switching node is inhibited. In some such embodiments, a routing protocol acknowledgement message may be transmitted via the network interface through which initial routing protocol message was received at the given switching node in order to confirm receipt of the initial routing protocol message. Such routing protocol acknowledgement messages do not include routing protocol information, and therefore do not comprise forwarded/generated routing protocol messages.

For example, a routing protocol message received at switching node 102 via its external network interface from external network entity 122 may be forwarded to control node 110 for processing. The resulting generated routing protocol messages may not need to be transmitted back to external network entity 122. Therefore, in embodiments, transmission of generated routing protocol messages may be inhibited if the generated routing protocol message is to be transmitted to a switching node 102, 104, 106, 108 for forwarding via a network interface at which an initial routing protocol message was received. In some embodiments, the aforementioned determination of whether a switching node 102, 104, 106, 108 is an edge switching node may exclude from consideration a network interface at which an initial routing protocol message was received.

In some embodiments, the initial routing protocol message may have been received at a first protocol processing function comprised within control node 110, from a second, different protocol processing function comprised within control node 110, via the network emulated within control node 110. In such embodiments, in order to prevent transmission of unnecessary routing protocol messages, transmission of a resulting generated routing protocol message from the first protocol processing function to the second protocol processing function may be inhibited. More generally speaking, if the predetermined trigger event is receipt of an initial routing protocol message, then transmission of a resulting generated routing protocol may be inhibited where the generated routing protocol message would be transmitted to the sender of the initial routing protocol message. This is further illustrated in relation to FIG. 3.

Figure 3:
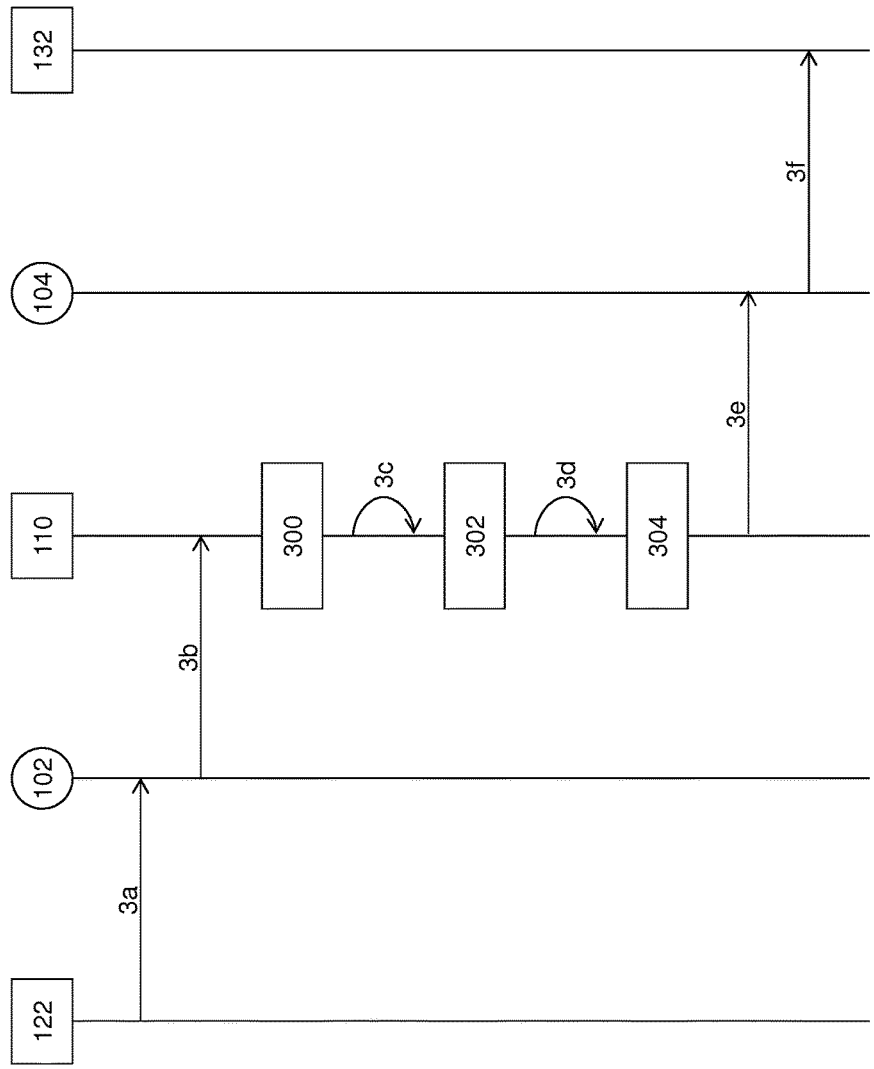
FIG. 3 shows a message flow diagram illustrating a routing protocol information transfer process according to one or more embodiments of the present invention.

FIG. 3 shows a message flow diagram illustrating a routing protocol information transfer process according to embodiments. Initially, routing protocol message 3a is received at switching node 102 via its external network interface from external network entity 122. In response to receipt of routing protocol message 3a, switching node 102 is configured to forward the routing protocol message to control node 110, via control link 112, as forwarded routing protocol message 3b. In the embodiments of FIG. 3, receipt of routing protocol message 3b at control node 110 comprises a predetermined trigger event. Therefore, in response to receipt of routing protocol message 3b, control node 110 is configured to process the routing protocol message at step 300. In embodiments, control node 110 is configured to modify routing protocol information stored in a protocol information database corresponding to switching node 102 in response to occurrence of the predetermined trigger event. In embodiments, modification of the routing protocol information in the protocol information database may be performed by a protocol processing function associated with the protocol information database and/or switching node 102.

As a result of initial routing protocol message 3a being received at switching node 102 via the external network interface, transmission of a new routing protocol message to switching node 102 for forwarding via that external network interface is inhibited. In some embodiments, another type of message, such as a routing protocol acknowledgement message (not shown), may be instead transmitted to switching node 102, as described previously. In some embodiments, control node 110 determines, during the processing at step 300, that switching node 102 is an edge switching node. However, because the only available external network interface is the one at which the initial routing protocol message was received, transmission of a new routing protocol message to switching node 102 is inhibited. In alternative embodiments, the external interface of switching node 102 is discounted by control node 110 when determining whether switching node 102 is an edge node during the processing at step 300, as a result of the initial routing protocol message being received by switching node 102 at the external network interface. In embodiments where the external interface of switching node 102 is discounted by control node 110, control node 110 does not determine that switching node 110 is an edge switching node, and therefore does not transmit a routing protocol message to switching node 102.

However, generated routing protocol messages may be transmitted for one or more of the adjacent switching nodes 106 and 108 in SDN 100, which are connected to switching node 102 via internal network links. In embodiments, the generated routing protocol messages are transmitted between the respective associated processing functions via the emulated network emulated within control node 110. For example, routing protocol message 3c is transmitted from the protocol processing function associated with switching node 102, to the protocol processing function associated with switching node 106, via the network emulated within control node 110. In embodiments, routing protocol message 3c includes data generated on the basis of the modified routing information in the protocol information database associated with switching node 102. A similar routing protocol message (not shown) may be transmitted from the protocol processing function associated with switching node 102, to the protocol processing function associated with switching node 108, via the network emulated within control node 110, however this has been omitted from FIG. 3 for simplicity.

In embodiments, receipt of routing protocol message 3c by the protocol processing function associated with switching node 106 is another predetermined trigger event. Therefore, routing protocol message 3c is processed at step 302. In response to receipt of routing protocol message 3c, control node 110 is configured to modify routing protocol information stored in a protocol information database corresponding to switching node 106. In embodiments, modification of the routing protocol information in the protocol information database may be performed by the protocol processing function associated with that protocol information database and/or switching node 106.

During the processing at step 302, control node 110 also determines that switching node 106 is not an edge switching node (i.e. it does not have any external network interfaces). Therefore, a routing protocol message is not transmitted from control node 110 to switching node 106 for forwarding via its network interfaces. However, switching node 106 does comprise two internal network interfaces. Therefore, generated routing protocol messages may be transmitted for one or more of the adjacent switching nodes 102 and 104, which are connected to switching node 106 via internal network links. Switching node 102 is discounted, as the initial routing protocol message was received from this switching node, although, as described previously, in some embodiments, an alternative message, such as a routing protocol acknowledgement message (not shown) may instead be transmitted to switching node 102. However, routing protocol message 3d is generated and transmitted from the protocol processing function associated with switching node 106, to the protocol processing function associated with switching node 104, via the emulated network emulated within control node 110. In embodiments, routing protocol message 3d includes data generated on the basis of the modified routing information in the protocol information database associated with switching node 106.

In embodiments, receipt of routing protocol message 3d by the protocol processing function associated with switching node 104 is yet another predetermined trigger event. Therefore, routing protocol message 3d is processed at step 304. In response to receipt of routing protocol message 3d, control node 110 is configured to modify routing protocol information stored in a protocol information database corresponding to switching node 104. In embodiments, modification of the routing protocol information in the protocol information database may be performed by the protocol processing function associated with that protocol information database and/or switching node 104.

During the processing at step 304, control node 110 also determines that switching node 104 is an edge switching node (i.e. it has one or more external network interfaces). Therefore, in response to the determination, routing protocol message 3e is transmitted from control node 110 to switching node 104, via control link 114, for forwarding via the external network interface of switching node 104. In embodiments, routing protocol message 3e includes data generated on the basis of the modified routing information in the protocol information database associated with switching node 104. In response to receipt of routing protocol message 3e, switching node 104 forwards the routing protocol message via its external network interface, to external network entity 132, as forwarded routing protocol message 3f. In this manner, the receipt of routing protocol message 3d, the processing at step 304 and the transmission of routing protocol message 3e reflect the steps of the process flow diagram represented in FIG. 2.

Switching node 104 also comprises two internal network interfaces. In some embodiments, generated routing protocol messages may also be transmitted for one or more of the adjacent switching nodes 106 and 108, which are connected to switching node 104 via internal network links. In embodiments, switching node 106 is excluded, as the initial routing protocol message was received from this switching node although, as described previously, in some embodiments, an alternative message, such as a routing protocol acknowledgement message (not shown) may instead be transmitted to switching node 106. However, a routing protocol message may be generated and transmitted from the protocol processing function associated with switching node 104, to the protocol processing function associated with switching node 108, via the network emulated within control node 110. In embodiments, this routing protocol message includes data generated on the basis of the modified routing information in the protocol information database associated with switching node 104. In this scenario, switching node 108 may have received two routing protocol messages which broadly relate to the same change in topology information, i.e. the information included within initial routing protocol message 3a.

In order to prevent transmission of unnecessary routing protocol messages, control node 110 may be configured to correlate received routing protocol messages to identify related routing protocol messages. In some such embodiments, the correlation is performed by the protocol processing functions associated with one or more of the switching nodes 102, 104, 106, 108 in SDN 100. In some such embodiments, generated routing protocol messages are not transmitted for switching nodes or interfaces from which such related routing protocol messages have already been received. In the example described above, the protocol processing function associated with switching node 108, having received related routing protocol messages from the protocol processing functions for both switching node 102 and switching node 104, may be configured not to send further related routing protocol messages, as there are no more connected switching nodes for which a related routing protocol message has not already been received.

In some embodiments, occurrence of a predetermined trigger event may include detection of a change in the network topology, for example, the degradation or interruption of an internal link between two of the switching nodes 102, 104, 106, 108 in SDN 100. Such a change in network topology may be detected by one or more of the adjacent switching nodes and/or control node 110 through conventional link state detection mechanisms. In response to such a detected change in the network topology, control node 110 is configured to update the protocol information stored in the protocol information database associated with one or more of the adjacent switching nodes, and transmit generated routing protocol messages for neighboring switching nodes as described above.

In embodiments, after modifying the routing protocol information stored in a given protocol information database, the control node may determine that a modification of the packet forwarding rules of the corresponding switching node 102, 104, 106, 108 is required. In such embodiments, in response to modification of the routing protocol information stored in the protocol information database, control node 110 is configured to transmit a configuration message from control node 110 to the corresponding switching node 102, 104, 106, 108 via the respective control link 112, 114, 116, 118. In embodiments, the configuration message is generated on the basis of the modified routing protocol information. In response to receipt of the configuration message, the switching node 102, 104, 106, 108 is configured to update its packet forwarding configuration according to the content of the received configuration message.

In some arrangements, control node 110 is configured with protocol processing functions which maintain protocol information databases for a subset of the switching nodes 102, 104, 106, 108 in SDN 100. In some such arrangements, control node 110 is configured with protocol processing functions which maintain protocol information databases for edge switching nodes 102, 104, but not interior switching nodes 106, 108. In such embodiments, control node 110 may separately maintain a protocol information database for the interior switching nodes 106, 108, and use this database to calculate protocol information for the interior switching nodes. The need to maintain individual protocol information databases for every node in the network is therefore alleviated, as multiple interior nodes in SDN 100 can share the same protocol information database. However, the protocol processing functions for the edge switching nodes 102, 104 ensure that protocol messages can still be exchanged with entities 122, 132, in external networks 120, 130.

In embodiments where control node 110 is configured without protocol processing functions for the interior switching nodes, control node 110 may be responsible for the generation of protocol information for interior switching nodes 102, 104. In some embodiments, control node 110 generates protocol information for interior switching nodes by running a shortest path first calculation for the internal nodes. In alternative embodiments, the protocol information for interior switching nodes may be user configured. In some embodiments, control node 110 is configured to also insert the generated protocol information into the protocol information databases corresponding to one or more edge switching nodes in SDN 100. This alleviates the requirement to generate routing protocol messages in order to communicate the generated routing protocol information for the interior switching nodes 106, 108 to the protocol processing functions associated with the edge switching nodes 102, 104. In such embodiments, insertion of generated protocol information into a protocol information database corresponding to an edge switching node 102, 104 in SDN 100 is a trigger event associated with that edge switching node. Configuring control node 110 to generate the routing protocol information for interior switching nodes 106, 108 in SDN 100 allows control node 110 to remain in control of the packet routing within SDN 100, as the routing decisions are not constrained by the operation of the legacy routing protocol.

In some embodiments, control node 110 is configured to modify the appearance of the internal topology of SDN 100 to external network entities. In some arrangements, control node 110 is configured to represent the cluster of switching nodes 102, 104, 106 and 108 in SDN 100 as a single switching node. Such a switching node may be referred to as a virtual switching node as it is different to the underlying physical hardware, i.e. the cluster of switching nodes 102, 104, 106 and 108.

Figure 4:
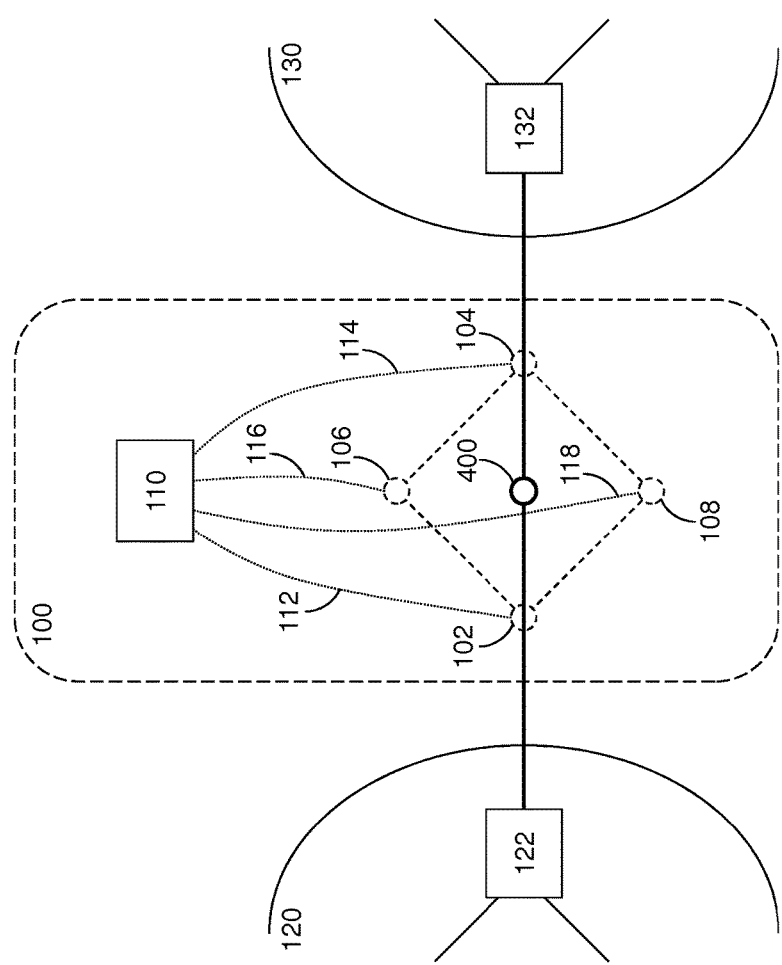
FIG. 4 shows an example SDN according to one or more embodiments of the present invention.

FIG. 4 illustrates SDN 100 according to embodiments, showing a virtual network topology overlaid. In the embodiments of FIG. 4, the cluster of switching nodes 102, 104, 106, 108 have been represented as a single, virtual switching node, 400. In FIG. 4, the underlying physical switching network as depicted previously in FIG. 1 is shown instead using dashed or broken lines. The thicker lines used to depict virtual switching node 400 and the links extending to/from virtual switching node 400 illustrate the overlaid virtual topology. Each external link between an edge switching node 102, 104 in SDN 100 and an entity outside of SDN 100 is represented as an interface on virtual switching node 400. In such embodiments, control node 110 may maintain a protocol information database for virtual switching node 400 which corresponds to all of the switching nodes in the cluster. In such embodiments, the protocol information database for virtual switching node 400 includes routing protocol information for virtual switching node 400, which represents switching nodes 102, 104, 106 and 108. Hence, the requirement to maintain multiple duplicate protocol information databases is further alleviated through the implementation of virtual switching node 400. In embodiments, control node 110 is configured to tune the advertised costs of the links between external virtual switching node 400 and external network entities 122, 132, in order to provide an accurate reflection of the actual underlying physical link costs. Such link costs may be determined though user configuration, or through topology calculations conducted by control node 110.

Figure 5:
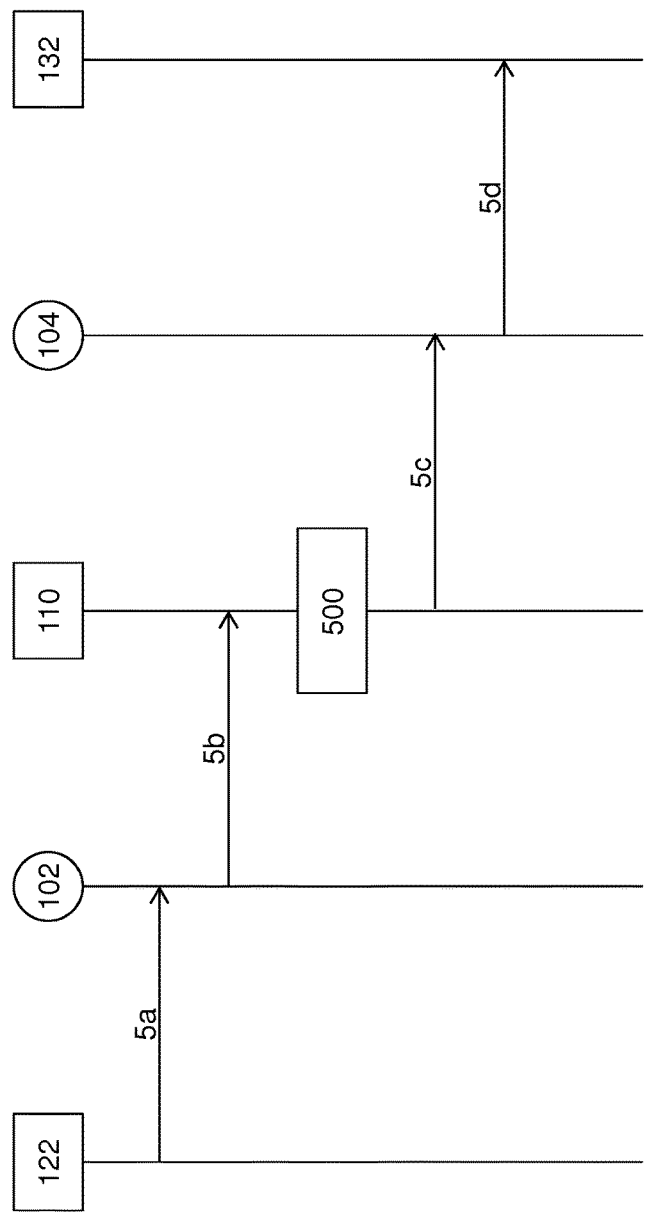
FIG. 5 shows a message flow diagram illustrating a routing protocol information transfer process according to one or more embodiments of the present invention.

FIG. 5 shows a message flow diagram illustrating a routing protocol information transfer process according to embodiments. Initially, routing protocol message 5a is received at switching node 102 via its external network interface from external network entity 122. In response to receipt of routing protocol message 5a, switching node 102 is configured to forward the routing protocol message to control node 110, via control link 112, as forwarded routing protocol message 5b. In the embodiments of FIG. 5, receipt of routing protocol message 5b at control node 110 comprises a predetermined trigger event. Therefore, in response to receipt of routing protocol message 5b, control node 110 is configured to process the routing protocol message at step 500. In embodiments, control node 110 is configured to modify routing protocol information stored in the protocol information database corresponding to virtual switching node 400 in response to occurrence of the predetermined trigger event. In embodiments, modification of the routing protocol information in the protocol information database may be performed by a protocol processing function associated with the protocol information database and the cluster of switching nodes 102, 104, 106, 108.

Having modified the routing protocol information in the protocol information database, control node 110 is configured to determine whether the switching nodes 102, 104, 106, 108 represented by virtual switching node 400 (and therefore associated with the protocol information database) include an edge switching node 102, 104. In response to determining that the switching nodes 102, 104, 106, 108 represented by virtual switching node 400 includes an edge switching node, control node 110 is configured to transmit a routing protocol message to one or more of the identified edge switching nodes. In the depicted embodiments, routing protocol message 5c is transmitted from control node 110 to switching node 104, via control link 114, for forwarding via the external network interface of switching node 104. In embodiments, routing protocol message 5c includes data generated on the basis of the modified routing protocol information in the protocol information database associated with virtual switching node 400. In response to receipt of routing protocol message 5c, switching node 104 forwards the routing protocol message via its external network interface, to external network entity 132, as forwarded routing protocol message 5d.

As described previously in relation to FIG. 3, transmission of a routing protocol message from control node 110 to edge switching node 102 for forwarding via its external interface may be inhibited, as, in the embodiments of FIG. 5, initial routing protocol message 5a was received via the external interface of edge switching node 102. As described previously, in some embodiments, an alternative message, such as a routing protocol acknowledgement message (not shown) may instead be transmitted to switching node 106. In further embodiments, the cluster of switching nodes represented by virtual switching node 400 may include one or more further edge switching nodes (not shown), each comprising an external network interface which connects the respective edge switching node to an external network. In such embodiments, control node 110 may be configured to determine that the switching nodes represented by virtual switching node 400 include a further edge switching node (not shown), and transmit a routing protocol message to the further edge switching node for forwarding via its external network interface(s). In embodiments, the routing protocol message transmitted to the further edge switching node comprises data generated on the basis of the modified routing protocol information in the protocol information database associated with virtual switching node 400.

In some embodiments, in response to modification of the routing protocol information stored in the protocol information database associated with virtual switching node 400, control node 110 is configured to transmit configuration messages to one or more of the switching nodes 102, 104, 106, 108 represented by virtual switching node 400, via the respective control links 112, 114, 116, 118. In embodiments, one or more of the configuration messages are generated on the basis of the modified routing protocol information. In response to receipt of a configuration message, the switching nodes 102, 104, 106, 108 are configured to update their respective packet forwarding configuration according to the content of the received configuration message.

In embodiments, control node 110 is configured to implement a change in the routing configuration of SDN 100, for example in response to user reconfiguration. A change in the routing configuration of SDN 100 may be implemented by modifying the contents of the protocol information database for virtual switching node 400. In embodiments, implementing a change in the routing configuration of SDN 100 is a predetermined trigger event.

In some arrangements, control node 110 is configured to represent the cluster of switching nodes 102, 104, 106 and 108 in SDN 100 as a combination of real and virtual switching nodes.

Figure 6:
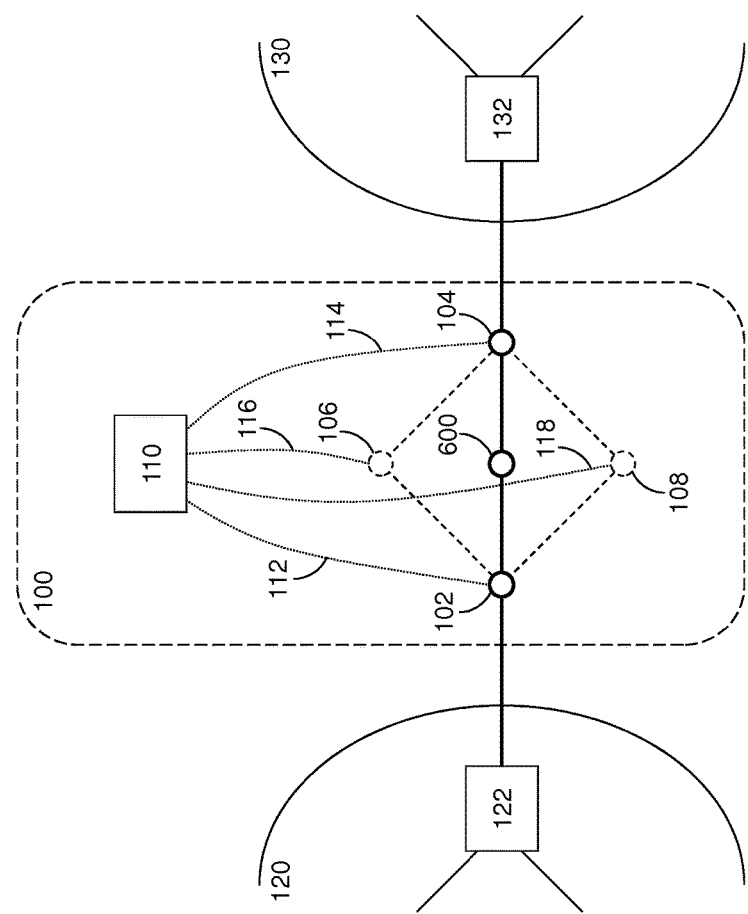
FIG. 6 shows an example SDN according to one or more embodiments of the present invention.

FIG. 6 illustrates SDN 100 according to embodiments, showing a virtual network topology overlaid. In the embodiments of FIG. 6, only the interior switching nodes 106 and 108 are represented by virtual switching node 600. Again, the underlying physical switching network is shown using dashed or broken lines; while the thicker lines used to depict switching nodes 102 and 104, virtual switching node 600, and the links extending between them, represent the virtual topology advertised outside of SDN 100. In embodiments, each link between an edge switching node 102, 104 and an interior switching node is represented as an interface on virtual switching node 600. In such embodiments, control node 110 may maintain a protocol information database for each exterior switching node 102, 104, as well as a protocol information database for virtual switching node 600, which corresponds to interior switching nodes 106 and 108. In such embodiments, the protocol information database for virtual switching node 600 includes routing protocol information for virtual switching node 600, which represents interior switching nodes 106 and 108. By representing SDN 100 through a combination of real and virtual switching nodes, physical networks with more complicated network or routing topologies can be represented, whilst still maintaining control of the packet routing configuration of SDN 100 at control node 110.

In some arrangements, control node 110 is configured to represent the cluster of switching nodes 102, 104, 106 and 108 in SDN 100 as a virtual topology which includes a plurality of virtual switching nodes. In such embodiments, subsets of the various switching nodes 102, 104, 106, 108 in SDN 100 may be represented by each virtual switching node. In some embodiments, a given switching node may be represented by more than one virtual switching node.

Figure 7:
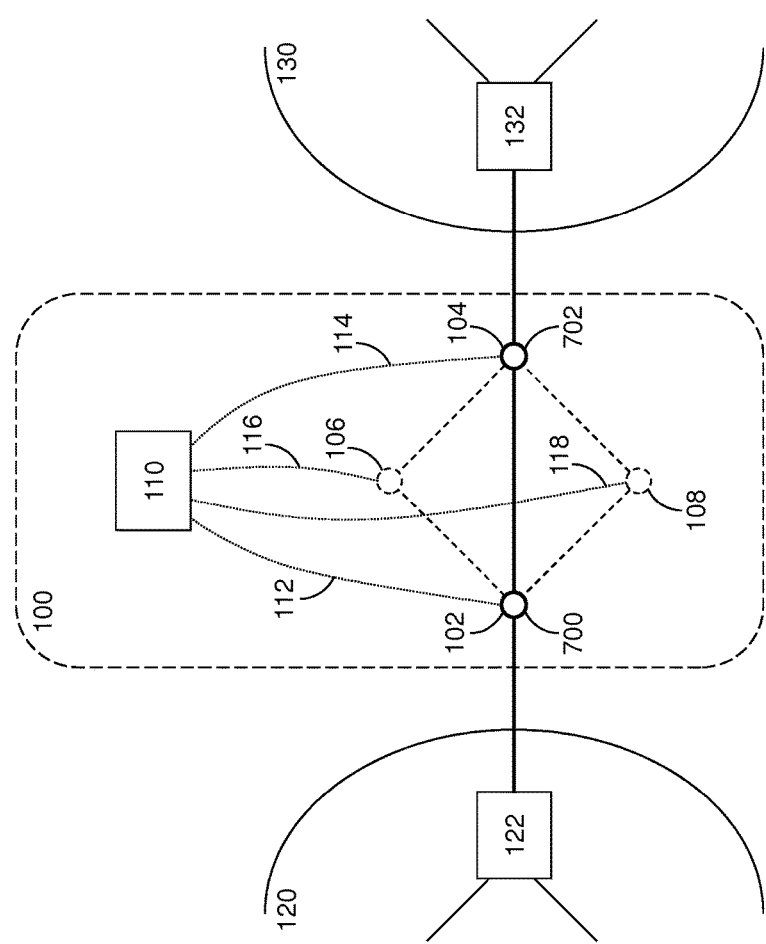
FIG. 7 shows an example SDN according to one or more embodiments of the present invention.

FIG. 7 illustrates SDN 100 according to embodiments, showing a virtual network topology overlaid. In the depicted embodiments, exterior switching nodes 102 and 104 are represented by virtual switching nodes 700 and 702 respectively. Interior switching nodes 106 and 108 are represented by the combination of virtual switching nodes 700 and 702. Again, the underlying physical switching network is shown using dashed or broken lines; while the thicker lines used to depict switching nodes 102 and 104, and the links extending between them, represent the virtual topology advertised outside of SDN 100. By incorporating interior switching nodes 106 and 108 into virtual switching nodes 700 and 702, the requirement to maintain routing protocol databases for any internal network nodes (real or virtual) is alleviated. It will be seen that by representing an SDN through different combinations of real and/or virtual switching nodes, arbitrarily complicated physical networking topologies can be represented.

In embodiments, SDN 100 is an Openflow™ controlled network. In some embodiments, control node 110 is an Openflow™ controller. In some embodiments, one or more of the switching nodes 102, 104, 106 and 108 are Openflow™ controlled switches.

In embodiments, control node 110 comprises a processor or processing system, as depicted by processor 111 in FIG. 1. In embodiments, the processing system comprises one or more processors and/or memory. Each device as described in relation to any of the embodiments described above may similarly comprise a processor and/or processing system. One or more of the aspects of the embodiments described herein with reference to the drawings comprise processes performed by control node 110. In embodiments, control node 110 comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

What is claimed is:

1. A method for transferring routing protocol information between a software defined network and one or more external networks, the method comprising:
   maintaining, at a control node responsible for controlling packet forwarding configurations of a plurality of switching nodes in the software defined network, a protocol information database comprising routing protocol information for one or more switching nodes in the plurality;
   in response to detecting occurrence of a predetermined trigger event, modifying, at the control node, the routing protocol information comprised within the protocol information database to create modified routing protocol information;
   determining, at the control node, that the one or more switching nodes include an edge switching node,
   wherein the determined edge switching node comprises an external network interface which connects the determined edge switching node to an external network, different to the software defined network, and
   wherein the determined edge switching node comprises an internal network interface which connects the determined edge switching node to a neighbor switching node in the plurality in the software defined network;
   in response to the determination, transmitting a routing protocol message from the control node to the determined edge switching node for forwarding via the external network interface of the determined edge switching node, the routing protocol message comprising data generated at least on the basis of the modified routing protocol information; and
   in response to the determination, inhibiting, at the control node, transmission of one or more further routing protocol messages to the determined edge switching node for forwarding via the internal network interface of the determined edge switching node to the neighbour switching node.

2. The method of claim 1, wherein the control node comprises a further protocol information database, the further protocol information database comprising routing protocol information for one or more further switching nodes in the plurality, different to the one or more switching nodes.

3. The method of claim 2, comprising, in response to occurrence of the predetermined trigger event, modifying, at the control node, the routing protocol information comprised within the further protocol information database.

4. The method of claim 2, wherein the control node comprises a first protocol processing function responsible for maintaining the protocol information database and a second protocol processing function responsible for maintaining the further protocol information database.

5. The method of claim 4, comprising transmitting a further routing protocol message, within the control node, from the first protocol processing function to the second protocol processing function, wherein the further routing protocol message is generated on the basis of the modified routing protocol information.

6. The method of claim 5, wherein the further routing protocol message is transmitted from the first protocol processing function to the second protocol processing function via an emulated network emulated within the control node, the emulated network providing connectivity between the first protocol processing function and the second protocol processing function.

7. The method of claim 4, wherein the routing protocol message is generated by the first protocol processing function.

8. The method of claim 1, comprising generating, at the control node, routing protocol information for one or more further switching nodes in the plurality, different to the one or more switching nodes for which routing protocol information is comprised within the protocol information database, wherein the routing protocol information comprised within the protocol information database is modified, at least in part, on the basis of the generated routing protocol information.

9. The method of claim 1, wherein the predetermined trigger event comprises receipt of an initial routing protocol message at the control node.

10. The method of claim 9, comprising inhibiting transmission of the routing protocol message in response to determining that the initial routing protocol message was forwarded to the control node by the edge switching node.

11. The method of claim 9, comprising inhibiting transmission of the routing protocol message in response to determining that the initial routing protocol message was received at the external network interface of the edge switching node.

12. The method of claim 9, wherein the initial routing protocol message is received from a switching node in the plurality other than the edge switching node.

13. The method of claim 1, wherein the predetermined trigger event comprises detecting a change in a routing configuration of the software defined network.

14. The method of claim 1, wherein the predetermined trigger event comprises implementing a change in the routing configuration of the software defined network.

15. The method of claim 1, comprising transmitting a configuration message from the control node to the edge switching node on the basis of the modified routing protocol information in order to modify a packet forwarding configuration of the edge switching node.

16. The method of claim 15, wherein the one or more switching nodes comprise a second switching node, the method comprising transmitting a further configuration message from the control node to the second switching node on the basis of the modified routing protocol information in order to modify the packet forwarding configuration of the second switching node.

17. The method of claim 1, comprising:
determining, at the control node, that the one or more switching nodes include at least a further edge switching node, different to the edge switching node, the further edge switching node comprising an external network interface which connects the further edge switching node to an external network, different to the software defined network; and
transmitting a further routing protocol message from the control node to the further edge switching node for forwarding via the external network interface of the further edge switching node, the further routing protocol message comprising data generated at least on the basis of the modified routing protocol information.

18. The method of claim 1, wherein the one or more switching nodes for which routing protocol information is comprised within the protocol information database are represented by a virtual switching node in the software defined network.

19. The method of claim 18, wherein the routing protocol message comprises routing information for the virtual switching node.

20. The method of claim 18, wherein the virtual switching node represents two or more switching nodes in the software defined network, including the edge switching node.

21. The method of claim 18, wherein the virtual switching node represents the plurality of switching nodes in the software defined network.

22. The method of claim 1, wherein the one or more switching nodes represents only the edge switching node in the software defined network.

23. The method of claim 1, wherein the protocol message comprises one or more of:
an Interior Gateway Protocol (IGP) message,
an Open Shortest Path First (OSPF) protocol message, and
an Intermediate System to Intermediate System (IS-IS) protocol message.

24. The method of claim 1, wherein the plurality of switching nodes in the software defined network comprises a cluster of switching nodes.

25. The method of claim 1, wherein the software defined network is an Openflow™ controlled network.

26. The method of claim 1, wherein the control node is an Openflow™ controller.

27. A system for use in transferring routing protocol information between a software defined network and one or more external networks, the system comprising:
at least one memory including computer program code; and
at least one processor in data communication with the at least one memory, wherein the at least one processor is configured to:
maintain, at a control node responsible for controlling packet forwarding configurations of a plurality of switching nodes in the software defined network, a protocol information database comprising routing protocol information for one or more switching nodes in the plurality;
in response to detecting occurrence of a predetermined trigger event, modify, at the control node, the routing protocol information comprised within the protocol information database to create modified routing protocol information;
determine, at the control node, that the one or more switching nodes include an edge switching node,
wherein the determined edge switching node comprises an external network interface which connects the determined edge switching node to an external network, different to the software defined network, and
wherein the determined edge switching node comprises an internal network interface which connects the determined edge switching node to a neighbour switching node in the plurality in the software defined network;
in response to the determination, transmit a routing protocol message from the control node to the determined edge switching node for forwarding via the external network interface of the determined edge switching node, the routing protocol message comprising data generated at least on the basis of the modified routing protocol information; and
in response to the determination, inhibit, at the control node, transmission of one or more further routing protocol messages to the determined edge switching node for forwarding via the internal network interface of the determined edge switching node to the neighbour switching node.

28. A non-transitory computer-readable storage medium comprising computer-executable instructions which, when executed by a processor, cause a computing device to perform a method of transferring routing protocol information between a software defined network and one or more external networks, the method comprising:
maintaining, at a control node responsible for controlling packet forwarding configurations of a plurality of switching nodes in the software defined network, a protocol information database comprising routing protocol information for one or more switching nodes in the plurality;
in response to detecting occurrence of a predetermined trigger event, modifying, at the control node, the routing protocol information comprised within the protocol information database to create modified routing protocol information;
determining, at the control node, that the one or more switching nodes include an edge switching node,
wherein the determined edge switching node comprises an external network interface which connects the determined edge switching node to an external network, different to the software defined network, and
wherein the determined edge switching node comprises an internal network interface which connects the determined edge switching node to a neighbour switching node in the plurality in the software defined network;
in response to the determination, transmitting a routing protocol message from the control node to the determined edge switching node for forwarding via the external network interface of the determined edge switching node, the routing protocol message comprising data generated at least on the basis of the modified routing protocol information; and in response to the determination, inhibiting, at the control node, transmission of one or more further routing protocol messages to the determined edge switching node for forwarding via the internal network interface of the determined edge switching node to the neighbour switching node.

\* \* \* \* \*